US005680750A

United States Patent [19]
Stefl

[11] Patent Number: 5,680,750
[45] Date of Patent: Oct. 28, 1997

[54] CORN HARVESTER HEAD HAVING ADJUSTABLE STRIPPER PLATES

[75] Inventor: Joel C. Stefl, Byron, N.Y.

[73] Assignee: Byron Enterprises Inc., Byron, N.Y.

[21] Appl. No.: 607,748

[22] Filed: Feb. 27, 1996

[51] Int. Cl.⁶ .......................... A01D 45/02; A01D 57/22
[52] U.S. Cl. ........................... 56/62; 56/99; 56/119
[58] Field of Search ...................... 56/62, 64, 76, 56/79, 80, 90, 119, 99, 59, 66, 75, 78, 82, 88, 93, 98

[56] References Cited

U.S. PATENT DOCUMENTS

| | | |
|---|---|---|
| 4,255,920 | 3/1981 | Janzen .................................. 56/126 |
| 4,531,351 | 7/1985 | Sousek ................................. 56/98 |
| 4,538,404 | 9/1985 | Heimark, Jr. et al. ............... 56/119 X |
| 4,845,930 | 7/1989 | Dow . | 
| 5,060,464 | 10/1991 | Caron . |

*Primary Examiner*—Terry Lee Melius
*Assistant Examiner*—Heather Shackelford
*Attorney, Agent, or Firm*—M. Lukacher

[57] ABSTRACT

Parallelogram linkage apparatus for slidably shifting stripper plates in a corn head of a corn harvesting machine to widen or narrow the gap between opposed plates in a row harvester. Each slidable stripper plate has a parallelogram linkage which slidably connects the plate to a supporting frame. The linkage includes two bell cranks pivotably mounted in spaced apart relationship on the frame and connected by an interconnecting arm and having an actuation shaft extending upward from a lobe of each bell crank to engage motion-transforming members at the stripper plate for transforming the arcuate motion of the bell cranks into linear motion of the stripper plate. The upper ends of the actuation shafts are guided in guide elements at the stripper plate elongated in the direction parallel to an edge of the stripper plate. In a preferred embodiment, the actuation shafts extend through openings in the stripper plate and are fitted with rollers which are guided between parallel flanges on the upper surface of the stripper plate. The parallelogram linkages of opposed stripper plates are pivotably connected to a common drag link by primary and secondary connecting levers, respectively, so that opposed plates in each row harvester are moved in opposite directions. Linkage to a common drag link permits all the plate gaps in a multiple row harvester corn head to be changed simultaneously and identically.

15 Claims, 6 Drawing Sheets

CORN HARVESTER HEAD HAVING ADJUSTABLE STRIPPER PLATES

The present invention relates to machines for harvesting ears of corns, such machines having corn harvesting heads which travel along the rows and receive stalks of corn ear stripping heads having one or more pairs of spaced-apart opposed plates for stripping ears from stalks, and most particularly to such machines wherein the spacing between the plates may be varied. This invention is especially suitable for use in a harvester for ears of sweet corn for the fresh corn or corn kernel canning markets, although the invention may also be useful for harvesting field corn varieties.

In a corn harvester for detaching the ears of corn from cornstalks in the field and conveying them to a collection conveyor, the ears and stalks of a row of corn enter between stripper plates of the corn head and are propelled by lugs on counter-rotating gathering belts through a gap between the plates. The ears are held upright on the plates while a knife rolls below the plates to cut the ears off the stalks while propelling the stalks downwardly (see, for example, U.S. Pat. No. 4,845,930 issued Jul. 11, 1989 to Dow).

Preferably, the gap between the stripper plates may be varied by moving one or both of the plates to optimize the gap for successive harvesting tasks. Different strains of corn and different degrees of ear maturity can require different widths of the stripper plate gap. Corn ears are prone to damage at the stripper plates when the gap is too wide and passes part or all of the ears below the plates. Also, the corn can be bruised and made unsuitable for the fresh or canning markets. Ideally, the stalk is drawn freely downward through the gap but the ears cannot pass. Failure to provide optimum width also can result in lowered yields from small ears passing through too wide a gap, or in reduced runtime from stalks becoming jammed in too narrow a gap.

It is known to provide means for adjusting the spacing of stripper plates for narrower row spacing and to reduce the opportunity for material to hang up on the mechanism. U.S. Pat. No. 5,060,464 issued to Caron on Oct. 29, 1991 discloses such apparatus. A rotatable horizontal shaft disposed longitudinally of the harvesting machine between adjacent row harvesters is provided with a pair of vertically-oriented bell cranks spaced apart on the shaft and connected by linkages to the outer edges of adjacent stripper plates. The stripper plates may be laterally shifted by rotation of the shaft and bell cranks as by a lever attached to the shaft. A drawback of having a horizontal actuating shaft with vertically disposed bell cranks connected to the edges of the stripper plates is that the linkages exert a torque on the stripper plates which can lift or twist the plates out of mutual planarity and parallelism. This can lead to jamming of the machine and reduced runtime.

It is a principal object of the invention to provide an improved mechanism for stripper plate gap adjustment wherein adjustment forces are parallel to the plane of the stripper plates.

It is a further object of the invention to provide an improved mechanism for stripper plate gap adjustment wherein a plurality of stripper plates may be shifted without inducing twist or misalignment in the plates.

Briefly described, adjustable stripper plates in accordance with the invention are components of a corn harvester, also known as a corn head, which may comprise a plurality of substantially identical parallel row harvesters. Each row harvester includes opposed fixed longitudinal hollow frames having a frame gap therebetween. Mounted on a surface of each frame, preferably an upper surface, is a stripper plate, the pairs of stripper plates in each row harvester thus having a longitudinal plate gap therebetween for receiving and passing rearward the corn stalks and ears in a planted row. At least one plate in each pair, and preferably both plates, is slidable on its frame transversely of the harvesting machine to vary the gap between the plates.

Individual stripper plates may have parallel, convergent, or divergent inner and outer edges. For purposes of discussion hereinbelow, the outer edge is taken as being substantially parallel to the direction of travel of the corn head and as a reference for movement of the stripper plate. Other directions of movement of the stripper plates to change gaps therebetween are possible and are fully within the scope of the present invention.

Below each stripper plate and preferably within the hollow frame is a linkage which in combination with motion-transforming members at the stripper plate forms a parallelogram linkage which can displace the plate to adjust the gap without applying torque to the plate. Each of the linkages uses the frame as a first and fixed side of the parallelogram. Each of the linkages also has a first and a second bell crank, and an interconnecting arm which moves with and connects the bell cranks. The interconnecting arm is a second side of the parallelogram opposite the first side. The bellcranks are horizontally and pivotably supported to the frame at their fulcrums, either by being pivotably disposed on fixed fulcrum shafts attached to the frame or by being fixedly attached to pivotable fulcrum shafts. Actuation shafts attached to first corners of the bell cranks extend vertically upwards toward the stripper plate where they engage motion-transforming members.

The motion of the actuation shafts as pivoted by the bell cranks is arcuate, but the desired motion of the stripper plate is linear in a direction transversely of the machine. The shafts are provided with bearing elements and the stripper plate is provided with guides which constrain the shafts in the desired direction of motion of the plate but do not constrain the shafts in the orthogonal direction which is parallel to an edge of the stripper plate.

In a preferred embodiment, the actuation shafts extend through openings in the frame and through mating openings in the stripper plate, the plate openings being elongated in a direction parallel to the outer edge of the stripper plate. The actuation shafts terminate in rollers above the plate which are rollable about the shafts between pairs of parallel flanges fixed to the upper surface of the stripper plate on either side of the openings.

The first bell crank is fixedly attached to a lever connected to a drag link extending transversely of the machine, actuation of which drag link pivots the bell crank to force the roller against the flanges to displace the stripper plate horizontally and transversely of the machine. The direction of the displacing force is in a plane including or immediately adjacent to the upper surface of the stripper plate. The drag link may be connected to an actuator, such as an hydraulic or pneumatic cylinder or a stepper motor, whereby the gaps of a plurality of stripper plate pairs may be adjusted remotely and simultaneously to a predetermined width.

All movable stripper plates in a harvester are equipped as just described. However, the first (arbitrarily left) plates differ from the second (arbitrarily right) plates in position of the bell cranks and crank levers or links. For all left plates, the first bell crank is mounted as a secondary lever, the actuation shaft being between the drag link and the fulcrum. For all right plates, the first bell crank is mounted as a primary lever, the fulcrum being between the drag link and the actuation shaft. For each plate, the second bell crank is mounted like the first. Movement of the drag link thus causes the left and right plates to slide in equal and opposite directions, either widening or narrowing the gap therebetween.

The foregoing and other objects, features, and advantages of the invention, as well as presently preferred embodiments thereof, will become more apparent from a reading of the following description in connection with the accompanying drawings in which:

Figure 1:
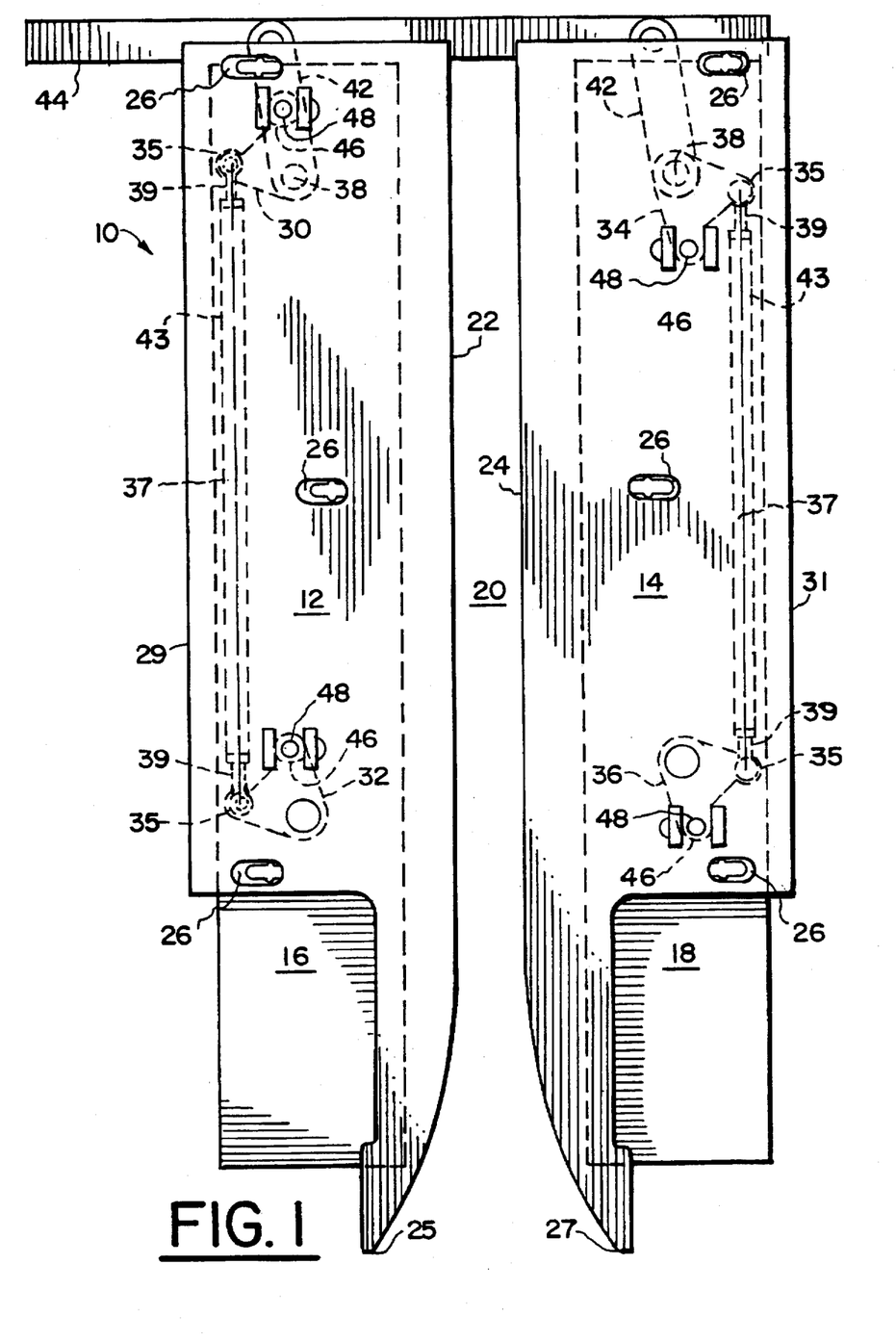
FIG. 1 is a plan view of a pair of stripper plates and gap-adjusting linkages in accordance with the invention, the gap having maximum width.
Figure 3:
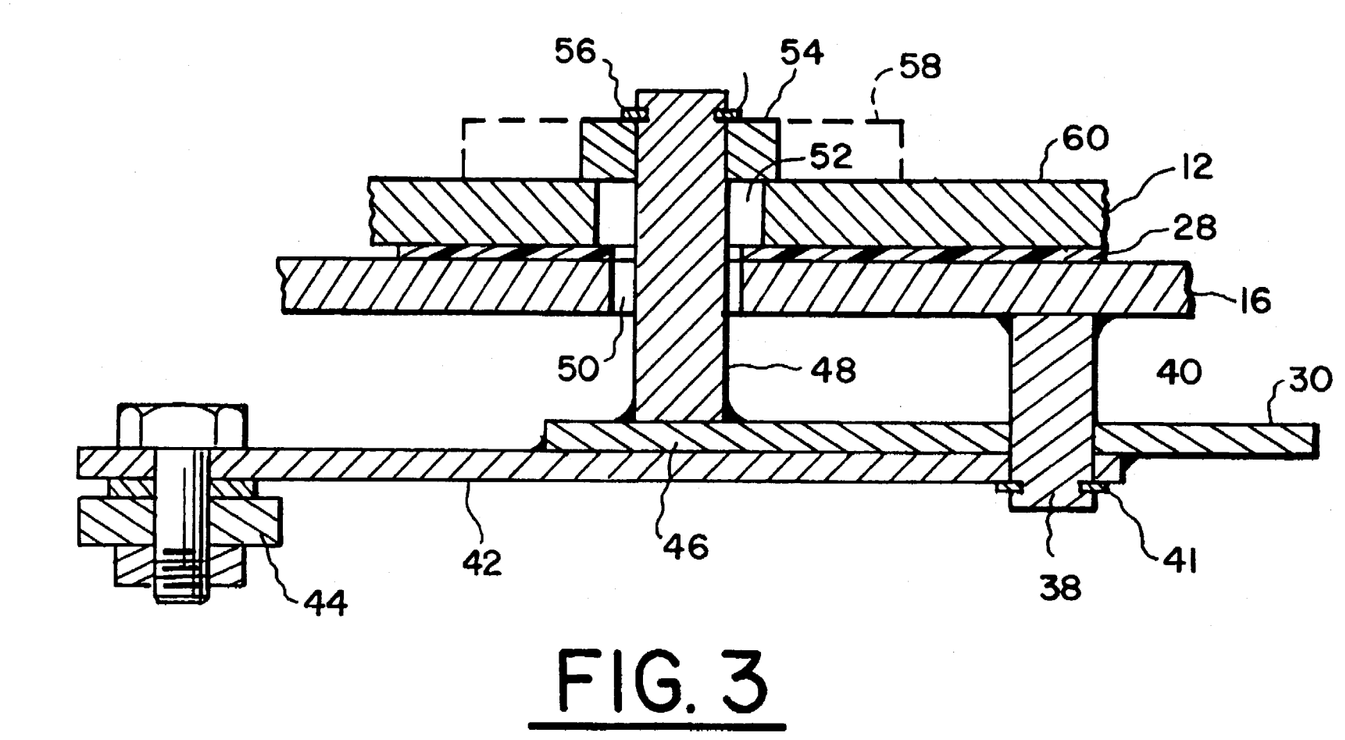
FIG. 3 is a cross-sectional view taken along line 3—3 in FIG. 2.
Figure 4:
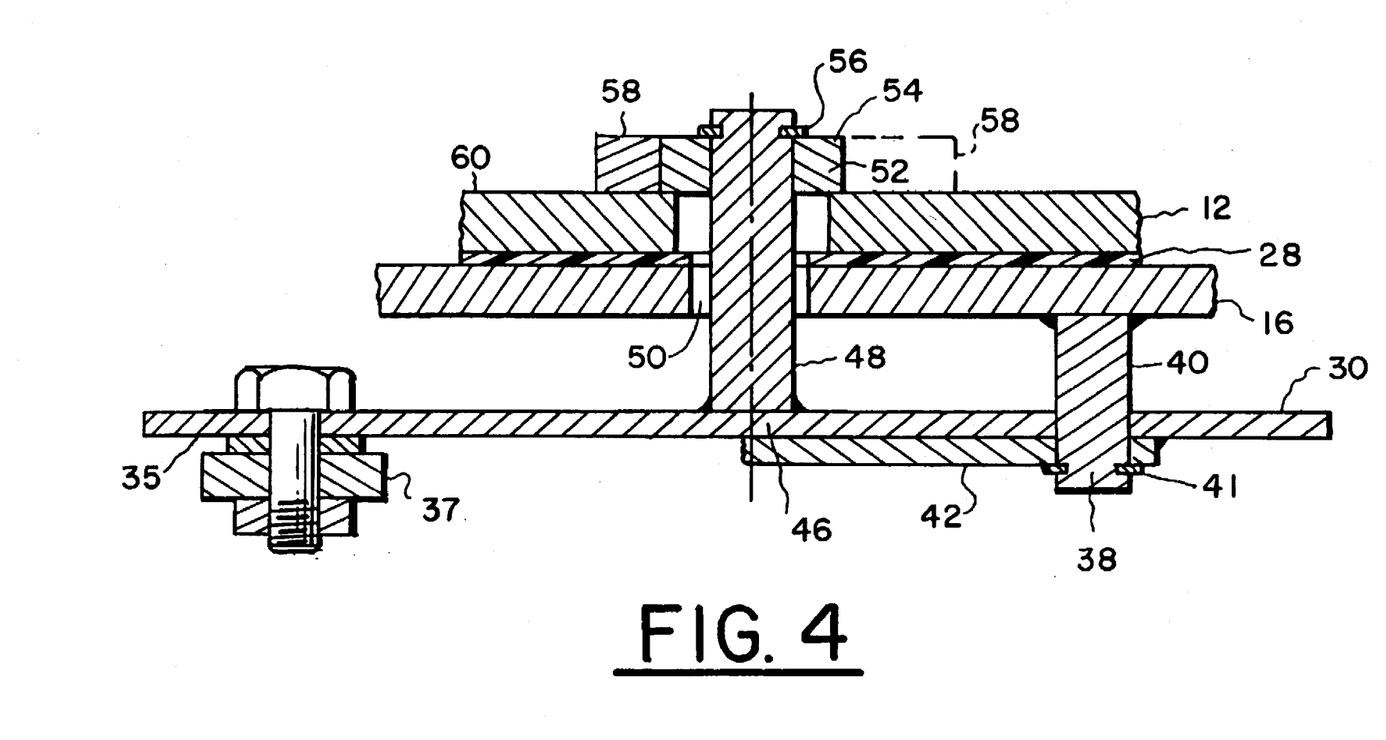
FIG. 4 is a cross-sectional view taken along folded line 4—4 in FIG. 2.

Referring to FIGS. 1, 3, and 4, there is shown a portion of a corn head 10 having left and right stripper plates 12 and 14, respectively, slidably mounted on left and right supporting frames 16 and 18, respectively. Stripper plates 12 and 14 have an adjustable gap 20 between left and right inner edges 22 and 24, respectively, and divergent noses 25 and 27, respectively, for receiving the corn stalks therebetween and guiding them into gap 20. Edges 22 and 24 are preferably divergent, although convergent or parallel edges can be useful in some applications. Plates 12 and 14 also have outer edges 29 and 31, respectively, and are slidably attached to frames 16 and 18 by flange-headed retainers (not shown) which are fixed on the frames and extend through slotted openings 26 in the stripper plates, which slots are elongated in the desired direction of sliding of the stripper plates, orthogonal to the outer edges 29 and 31 thereof. A lubricating plastic sheet or coating 28 is preferably included between the stripper plates and the supporting frames.

First and second left bell cranks 30 and 32, respectively, and first and second right bell cranks 34 and 36, respectively, are parallelogram members pivotably journalled at their fulcrums 38 below the frames on fulcrum shafts 40 attached to the frames, and are retained by a spring clip 41. Fulcrum shafts 40 preferably are spaced apart along a line parallel to edges 29 and 31. First bell cranks 30 and 34 are fixed as by welding to actuating links or levers 42 which are pivotably attached to a reciprocable drag link 44 disposed substantially transverse of the machine, movement of which drag link pivots all the actuating links and first bell cranks attached thereto through a desired arc of rotation 55 (FIGS. 6 and 7) parallel to the stripper plates to adjust gap 20 as described hereinbelow. In a typical corn head harvesting machine having a plurality of parallel corn row harvesters, the first bell cranks of all the stripper plates are thus connected, permitting the simultaneous setting of all the stripper plate gaps.

Figure 6:
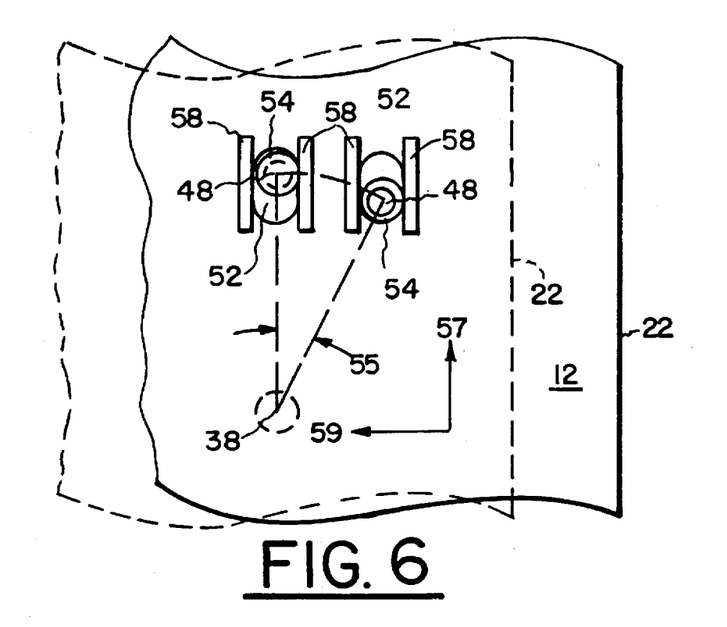
FIG. 6 is a plan view of motion-transforming elements of the invention, showing how the arcuate motion of the actuating shaft is transformed into linear motion of the stripper plate.

From a first lobe 46 of each bell crank, an actuation shaft 48 extends vertically to engage motion-transforming members or elements including a guide or guides in or on the stripper plate. In a first embodiment shown in FIGS. 1–4 and 6, actuation shaft 48 extends through an enlarged opening 50 in the frame and an enlarged elongated opening 52 in the stripper plate. Opening 52 is elongated in a direction parallel to the outer edge 29 or 31 of the stripper plate. A roller 54 is journalled on the upper end of shaft 48 and is retained by a spring clip 56. A pair of parallel flanges 58 affixed to the upper surface 60 of the stripper plate as by welding guide the roller longitudinally of the stripper plate during pivoting of the bell cranks. Since the arcuate path of the roller through pivot angle 55 is unconstrained in the vector direction 57 parallel to the inner edge 22 of the plate and is fully constrained in the vector direction 59 normal to the edge of the plate, the plate is moved by action of the roller only in the direction normal to the edge, as shown in FIG. 6, to widen or narrow the gap between the plates depending upon the direction of pivoting of the bell cranks.

First and second bell cranks are pivotably connected at second lobes 35 thereof to opposite ends of an interconnecting arm 37, whereby pivoting motion of the first bell crank is imitated exactly by pivoting motion of the second bell crank. Arm 37 preferably has ball joint ends 39 threaded into a central shaft 43 whereby the length of arm 37 and therefore the distance between the second lobes of the first and second bell cranks may be adjusted to assure that the stripper plate internal edges 22 and 24 are parallel or consistently convergent or divergent as required.

Figure 5:
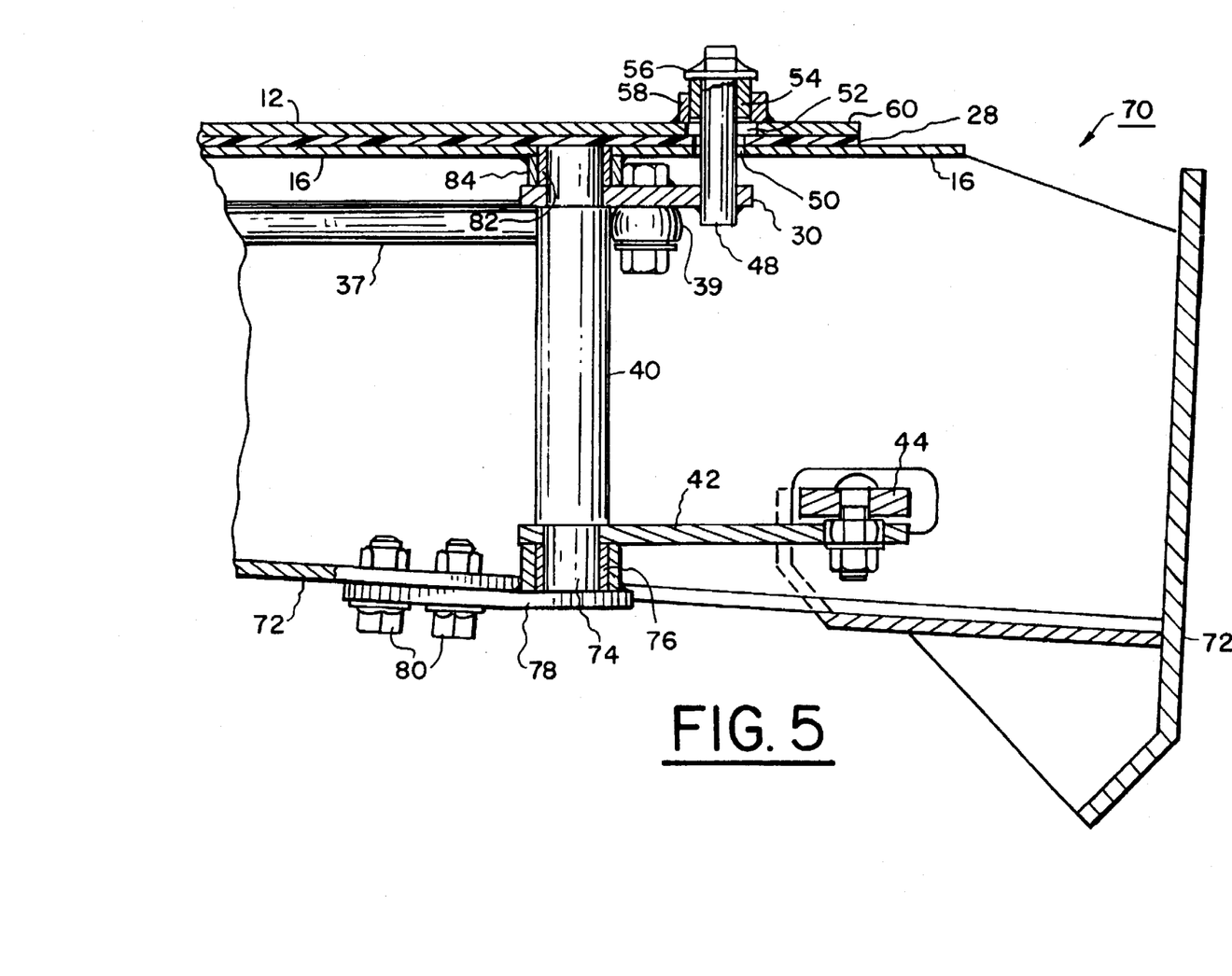
FIG. 5 is a cross-sectional view showing alternative linkage in accordance with the invention.

An alternative embodiment 70 of mounting for the bell cranks is shown in FIG. 5, wherein the fulcrum shaft is disposed to pivot and the bell crank and actuating link are fixedly attached thereto. A second portion 72 of frame 16 rotatably supports a lower end 74 of an elongated fulcrum shaft 40 in a bushing 76 contained in a lower bushing mount 78 attached as by bolts 80 to frame 72. Shaft 40 is rotatably supported at its upper end by upper bushing 82 in a blind bushing mount 84 on the underside of first frame portion 16. Bell crank 30 is fixedly attached as by welding to shaft 40. Actuating link 42 is connected as by welding to shaft 40 to pivot the shaft to pivot the bell crank when actuated by drag link 44.

In a first alternative embodiment of motion-translating members (not shown), the openings in the stripper plates are omitted, the guide flanges are provided on the underside of the stripper plates, and the actuating shafts are shortened to permit the rollers to operate between the guides below the stripper plates.

Figure 7:
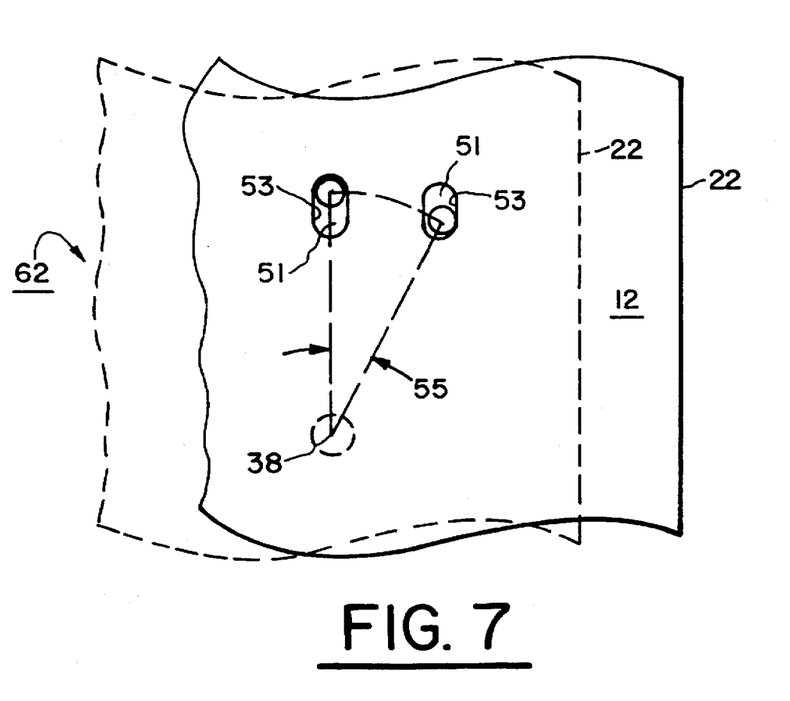
FIG. 7 is a plan view like that of FIG. 6, showing an alternative embodiment of the motion-transforming elements.

In a second alternative embodiment 62 of motion-translating members, shown in FIG. 7, the flanges and the rollers are omitted, the openings or bores 51 in the stripper plates are full-fitting on the actuating shafts 48 and are elongated in a direction parallel to an edge of the stripper plates. The actuation shaft bears directly on the wall 53 of the stripper plate opening, which serves as the motion-transforming guide. Preferably, the shafts are provided with lubricated or hardened wear surfaces.

Figure 2:
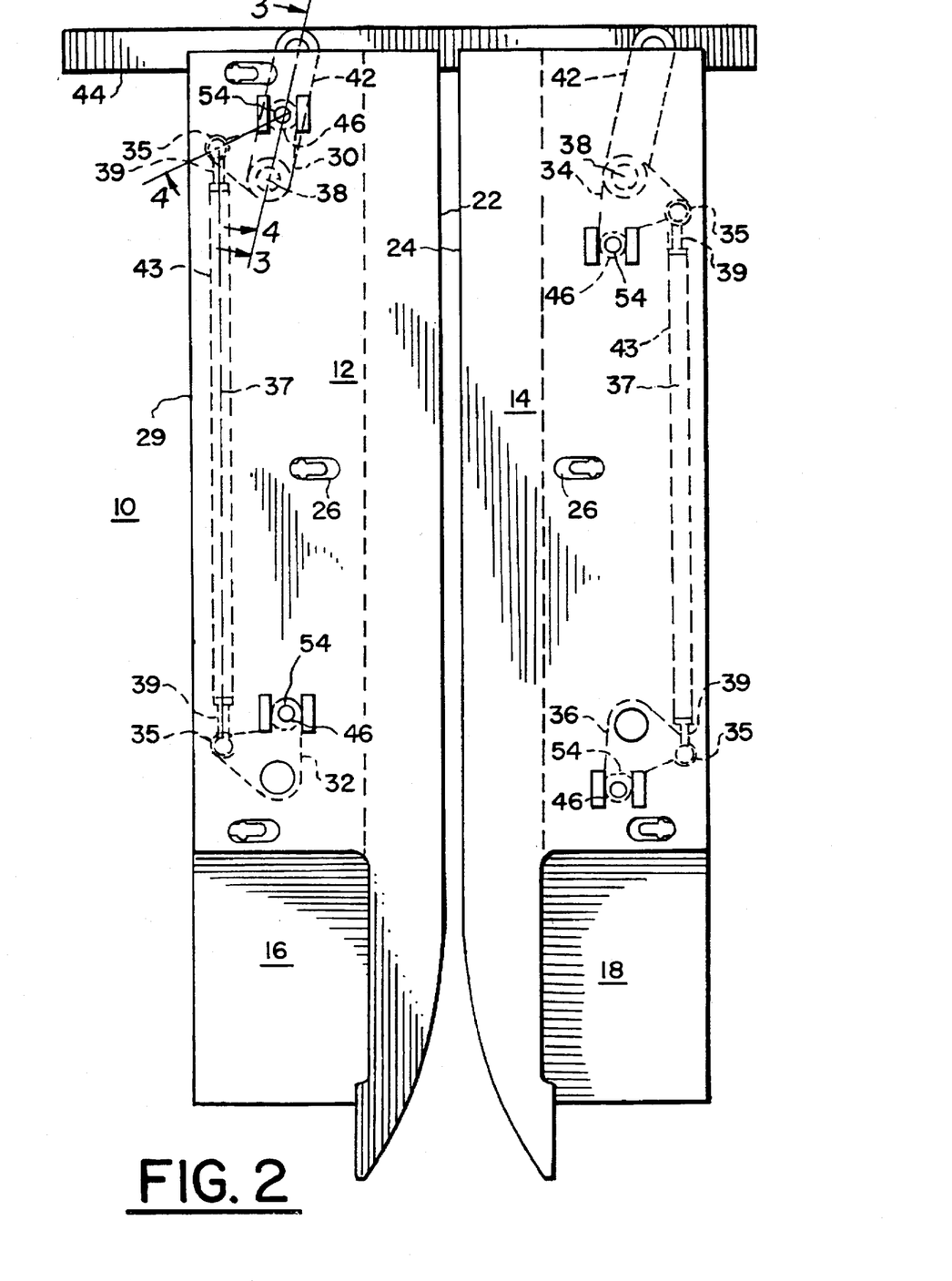
FIG. 2 is a plan view like that of FIG. 1, showing the plates shifted by the gap-adjusting linkages, the gap having minimum width.

The force of the bearing against the guides in a plane parallel and immediately adjacent to the upper plate surface 60 moves the left and right stripper plates transversely of the corn head without lifting or misaligning the stripper plates. First left bell crank 30 is joined to its actuating link 42 (which forms essentially an additional or third lobe, in a separate plane, on bell crank 30) to form a secondary lever wherein the actuation of the left stripper plate by roller 54 occurs between the drag link 44 and the bell crank fulcrum 38. First right bell crank 34 is joined to its actuating link 42 (which forms essentially an additional or third, in a separate plate, on bell crank 34) to form a primary lever wherein the bell crank fulcrum 38 is between the drag link 44 and the actuation of the right stripper plate by its roller 54. Thus, movement of drag link 44 causes the left and right stripper plates to move in equal and opposite directions to widen or narrow gap 20 therebetween. Movement of the drag link to the right, as shown between FIGS. 1 and 2, moves the left stripper plate to the right and the right stripper plate to the left, narrowing the gap 20 as shown in FIG. 2. Movement of the drag link to the left widens the gap.

From the foregoing description it will be apparent that there has been provided an improved corn head, wherein the gap between stripper plates in pairs may be adjusted and set without exerting torque on the stripper plates. Variations and modifications of the herein described corn head, in accordance with the invention, will undoubtedly suggest themselves to those skilled in this art. Accordingly, the foregoing description should be taken as illustrative and not in a limiting sense.

What is claimed is:

1. In a corn head for a corn harvester, said corn head having first and second stripper plates separated by a gap, an apparatus for adjusting the width of said gap, said apparatus comprising at least said first stripper plates, a parallelogram linkage slidably connecting said first stripper plate to a supporting frame, said linkage including pivot members mounted on said frame, said pivot members being pivotable along an arc disposed in a plane which is substantially parallel to said first stripper plate and being connected to motion-transforming members attached to said first stripper plate, said transforming members translating an arcuate motion of said pivot members into linear motion of said first stripper plate in a first direction with respect to said second stripper plate.

2. Gap-adjusting apparatus in accordance with claim 1 wherein said pivotable members mounted on said frame include first and second bell cranks each having first and second actuation lobes and being pivotably mounted at their fulcrums on first and second fulcrum shafts, respectively, said shafts being spaced apart and fixed to said supporting frame along a line parallel to an edge of said first stripper plate.

3. Gap-adjusting apparatus in accordance with claim 2 further comprising first and second actuation shafts fixedly mounted on said first lobes of said first and second bell cranks and extending towards said first stripper plate.

4. Gap-adjusting apparatus in accordance with claim 2 further comprising an interconnecting arm having opposite ends which are pivotably attached to said second lobes of said first and second bell cranks, respectively, to link said bell cranks for identical pivotal movement.

5. Gap-adjusting apparatus in accordance with claim 2 further comprising a lever having an end fixedly attached to said first bell crank for pivoting said first bell crank about said first fulcrum shaft.

6. Gap-adjusting apparatus in accordance with claim 5 wherein said lever is pivotably attached to a drag link for moving said lever to pivot said first bell crank.

7. Gap-adjusting apparatus in accordance with claim 3 wherein each said motion-transforming members is attached to a bearing element on said first actuation shaft and a guide on said stripper plate.

8. Gap-adjusting apparatus in accordance with claim 7 wherein said bearing element is selected from the group consisting of a surface of said actuation shaft, a lubricating coating on said actuation shaft, a hardened coating on said actuation shaft, and a roller mounted on said actuation shaft.

9. Gap-adjusting apparatus in accordance with claim 7 wherein said guide is selected from the group consisting of a pair of flanges mounted on a surface of said first stripper plate and being substantially parallel to said edge thereof, and the wall of a bore through said first stripper plate being elongated in a direction substantially parallel to said edge of said first stripper plate.

10. Gap-adjusting apparatus in accordance with claim 1 wherein said pivot members mounted on said frame include first and second bell cranks fixedly mounted at their fulcrums on first and second fulcrum shafts, respectively, said shafts being spaced apart and pivotably mounted on said supporting frame along a line parallel to an edge of said first stripper plate.

11. Gap-adjusting apparatus in accordance with claim 10 further comprising a lever having an end fixedly attached to said first fulcrum shaft for pivoting said first bell crank.

12. Gap-adjusting apparatus in accordance with claim 11 wherein said lever has an opposite ends which is pivotably attached to a drag link for moving said lever to pivot said first bell crank.

13. Gap-adjusting apparatus in accordance with claim 1 further comprising a second parallelogram linkage slidably connecting said second stripper plate to said supporting frame, said second linkage including second pivot members mounted on said frame and pivotable along an arc generally in a plane which is substantially parallel to said second stripper plate, said second pivot members connected to second motion-transforming members attached to said second stripper plate for translating an arcuate motion of said second pivot members into linear motion of said second stripper plate with respect to said first stripper plate in a second direction opposite to said first direction, said first parallelogram linkage including a secondary lever and said second parallelogram linkage including a primary lever.

14. In a corn head for a corn harvester, said corn head having a plurality of pairs of first and second stripper plates, the plates of each pair being separated by a gap, apparatus for adjusting the width of said gaps comprising a plurality of first and second parallelogram linkages slidably connecting said first and second stripper plates, respectively, to a supporting frame, said first and second linkages including pivot members mounted on said frame defining secondary and primary levers, respectively, each said pivot members a being pivotable along arcs generally in planes which are substantially parallel to said first and second stripper plates, respectively, and being connected to motion-transforming members attached to said stripper plates for transforming an arcuate motion of said pivotable members into linear motion of said stripper plates, said linkages further including a plurality of levers connecting each of said parallelogram linkages to a common drag link, movement of said drag link causing said first stripper plates to be moved in a first direction and said second stripper plates to be moved in a second direction opposite to said first direction to change said gaps between said first and second stripper plates.

15. In a corn head for a corn harvester having a pair of stripper plates supported on a frame for receiving corn stalks and ears in a gap therebetween and passing the stalks between the plates while retaining the ears above the plates, apparatus for moving at least one of the stripper plates with respect to the other stripper plate to change the width of the gap comprising:

a) first and second bell cranks each having first and second lobes, said bell cranks being spaced apart in the direction of travel of the harvester and disposed at their respective fulcrums on first and second fulcrum shafts having axes substantially normal to said stripper plate, said shafts being pivotably mounted on said frame supporting one of said stripper plate;

b) an interconnecting arm having opposite ends pivotably attached to respective first lobes on said first and second bell cranks;

c) first and second actuation shafts fixed to said second lobes of said first and second bell cranks, respectively, and extending through first and second openings in said frame and first and second openings in said one stripper plate;

d) first and second rollers rotatably mounted on said first and second actuation shafts, respectively;

e) first and second pairs of flanges mounted on an upper surface of said one stripper plate to receive said first and second rollers, respectively; and f) a drag link connected to said first fulcrum shaft to pivot said first and second bell cranks to force said first and second rollers against said first and second pairs of flanges, respectively, to change the width of said gap between said stripper plates.

* * * * *